United States Patent
Heubner et al.

(10) Patent No.: US 10,407,041 B2
(45) Date of Patent: Sep. 10, 2019

(54) ELECTRIC PARKING BRAKE ACTUATOR FOR ACTUATION OF A PARKING BRAKE IN A MOTOR VEHICLE

(71) Applicant: FTE automotive GmbH, Ebern (DE)

(72) Inventors: Wilhelm Heubner, Itzgrund (DE); Sonja Lenke, Oberaurach/Oberschleichach (DE); Katrin Ebert, Hofheim (DE)

(73) Assignee: FTE automotive GMBH, Ebern (DE)

( * ) Notice: Subject to any disclaimer, the term of this patent is extended or adjusted under 35 U.S.C. 154(b) by 0 days.

(21) Appl. No.: 15/832,211

(22) Filed: Dec. 5, 2017

(65) Prior Publication Data
US 2018/0154881 A1   Jun. 7, 2018

(30) Foreign Application Priority Data
Dec. 7, 2016   (DE) .................. 10 2016 014 523

(51) Int. Cl.
*B60T 13/74*   (2006.01)
*F16D 65/14*   (2006.01)
(Continued)

(52) U.S. Cl.
CPC ............ *B60T 13/746* (2013.01); *F16D 65/14* (2013.01); *F16H 63/34* (2013.01);
(Continued)

(58) Field of Classification Search
CPC .. B60T 13/743; B60T 13/746; F16D 2125/50; F16D 2121/24; F16D 65/14;
(Continued)

(56) References Cited

U.S. PATENT DOCUMENTS 5,704,457 A    6/1998  Kimura et al.
8,307,960 B2*  11/2012 Seuser .................. B60T 13/746
                                                    188/156
(Continued)

FOREIGN PATENT DOCUMENTS

DE    102010054911 A1    8/2011
DE    102010027826 A1    10/2011
(Continued)

OTHER PUBLICATIONS

German Office Action, Applicant: FTE automotive GmbH, Application No. 102016014523.4, dated Sep. 18, 2017, 4 pages.
(Continued)

*Primary Examiner* — Xuan Lan Nguyen
(74) *Attorney, Agent, or Firm* — Reising Ethington P.C.

(57) ABSTRACT

An electric parking brake actuator has a transmission mechanism, which is rotationally drivable by an electric motor and converts rotational movement into an axial movement of an actuating rod that carries an actuating element for the parking brake. The actuating rod normally moves by electric motor displacement via the transmission mechanism from an unblocking position to a blocking position and vice versa. A blocking mechanism serves the purpose of holding the actuating rod in the unblocking position of the actuating rod against the force of a spring element. A blocking disc, which is in drive connection with the transmission mechanism, has a stop surface for a locking device in only one rotational direction of the blocking disc. For secondary alternate operation the stop surface is releasable by the locking device so that the actuating rod is biased by the spring element to the blocking position without electric-motorized assistance.

26 Claims, 9 Drawing Sheets

(51) Int. Cl.
*F16H 63/34* (2006.01)
*F16D 127/06* (2012.01)
*F16D 121/24* (2012.01)
*F16D 125/48* (2012.01)

(52) U.S. Cl.
CPC ..... *F16H 63/3416* (2013.01); *F16H 63/3441* (2013.01); *F16H 63/3466* (2013.01); *F16H 63/3491* (2013.01); *B60T 13/743* (2013.01); *F16D 2121/24* (2013.01); *F16D 2125/48* (2013.01); *F16D 2127/06* (2013.01)

(58) Field of Classification Search
CPC .. F16D 2127/06; F16D 2125/48; F16H 63/34; F16H 63/3416; F16H 63/3441; F16H 63/3466; F16H 63/3491
See application file for complete search history.

(56) References Cited

U.S. PATENT DOCUMENTS

| | | |
|---|---|---|
| 2002/0045506 A1 | 4/2002 | Scheuerer |
| 2008/0293534 A1* | 11/2008 | Dettenberger ........ B60T 13/746 475/154 |
| 2013/0008156 A1* | 1/2013 | Heubner ............... F15B 11/122 60/476 |
| 2015/0075923 A1* | 3/2015 | Jang ...................... H02K 7/116 188/162 |
| 2015/0362032 A1* | 12/2015 | Son ........................ F16D 65/18 188/72.1 |
| 2016/0076614 A1* | 3/2016 | Narula ................ F16D 55/2255 188/162 |

FOREIGN PATENT DOCUMENTS

| | | |
|---|---|---|
| DE | 102012025096 A1 | 6/2014 |
| DE | 102015206156 A1 | 10/2016 |
| DE | 102015206157 A1 | 10/2016 |

OTHER PUBLICATIONS

European Search Report, Applicant: FTE automotive GmbH, Application No. 17001890.7, dated Jan. 10, 2018, 8 Pages.

* cited by examiner

ELECTRIC PARKING BRAKE ACTUATOR FOR ACTUATION OF A PARKING BRAKE IN A MOTOR VEHICLE

TECHNICAL FIELD

The present invention relates to an electric parking brake actuator for actuation of a parking brake in a motor vehicle. In particular, the invention refers to an electric parking brake actuator that is widely used in recent times in the automobile industry in motor vehicles with electrical drive axles, hybrid gearboxes and modern gearboxes with automatic transmissions.

PRIOR ART

Parking brakes are needed particularly when a self-locking effect of the drive motor for positionally fixing the motor vehicle cannot be used. Blocking of the drive train is then usually by way of a parking brake wheel, which is arranged on an output shaft of the gearbox to be secure against relative rotation and has a toothing and which can be mechanically positively locked at the toothing by a parking brake pawl pivotably mounted on a parallel axle, in which case the parking brake pawl has to be pivoted against the force of a return spring biasing the parking brake pawl away from the parking brake wheel and into an unblocked setting. Apart from hydraulic parking brake actuators, use can also be made of electric parking brake actuators serving the purpose of producing a linear movement by way of which an actuating element, for example in the form of a cam or a cone, is movable against the parking brake pawl so as to cause the parking brake pawl to pivot.

In order to ensure that the parking brake prevents the motor vehicle from rolling away even when the parking brake pawl, when actuated, comes into contact with a tooth of the parking brake wheel without achieving a mechanically positive couple with the toothing, an energy store (advancing spring) is additionally provided at the actuating element and, if the motor vehicle rolls, advances the parking brake pawl by way of the actuating element so that the pawl comes into engagement with the toothing of the parking brake wheel. Moreover, it is desired to provide a secondary alternate actuating mechanism enabling application of the parking brake in the event the actuator does not actuate.

There is no lack of proposals in the prior art with regard to realizing these functions in an electric parking brake actuator. One electric actuating device for a parking brake is disclosed in the document U.S. Pat. No. 5,704,457, that has a cam surface on the side of the parking brake pawl remote from the parking brake wheel, wherein a follower roller of the actuating device can be brought into contact with the cam surface for pivoting the parking brake pawl. The follower roller is mounted on an end of a presser lever which is rotatably mounted on an axle and which by way of a torsion spring as energy store (advancing spring) is operatively connected with a control lever rotatably mounted on the same axle. The control lever can, for actuation of the parking brake, be pivoted by way of a connecting rod which is axially displaceable by a transmission mechanism including an eccentric disc to which the connecting rod is coupled and, for rotation of the eccentric disc, a multi-stage spur gear transmission, which in turn can be driven by an electric motor. A first freewheel, which enables both electric-motorized and manual actuation of the transmission mechanism, is provided in the spur gear transmission. Consequently, the transmission mechanism can drive in only one rotational direction of the electric motor for electric-motorized application and release of the parking brake. In order to absorb the forces, which act in the applied state of the parking brake, of the return spring at the parking brake pawl and the torsion spring (advancing spring) between presser lever and control lever a second freewheel preventing return rotation of the eccentric disc is provided at the eccentric disc.

In the event the electric motor does not actuate, the eccentric disc can, be rotated by use of a manual actuating mechanism including several levers and a cable pull to actuate the parking brake.

A disadvantage of this prior art is evident in the comparatively complex construction of the actuating device. Moreover, it would be desirable if in the event the electric motor does not actuate, a secondary alternate actuation of the parking brake by stored energy could take place.

Such a parking brake arrangement is known from, for example, document DE 10 2010 054 911 A1. In this parking brake arrangement, actuation of the parking brake in normal operation takes place by way of a rotary movement, which is produced by use of an electric motor and transmitted by way of a spur gear transmission and which is converted with the help of a guide element into a translational movement and transmitted to a tie rod biased by a spring element in the direction of blocking. The translational movement of the tie rod acts on an actuating element by an inclined surface in the form of a cone provided for actuation of the parking brake pawl. More specifically, the axial adjustment of the tie rod, which is secured against rotation, takes place by way of a guide block which is connected with the tie rod and which is guided in a guide track of the guide element drivable by use of the electric motor with step-down transmission. The end position, which is associated with the unblocking setting, of the guide track is disposed behind the top dead center of the guide track. Consequently, a negative slope exists in this region, as a result of which the tie rod, which is biased by way of this spring element, at the guide element is set in the unblocking setting. In order to achieve the blocking setting of the tie rod, the guide element is rotated by the electric motor, in which case the guide block travels beyond the upper dead center of the guide track and due to the tie rod moves with the assistance of the spring element into the blocking setting until the guide block reaches a lower end position in the guide track. The guide block can be moved back out of this lower end position of the guide track—and thus the tie rod out of its blocking setting—only by reversal of the rotational direction of the electric motor, so as to return to the unblocking setting.

In order to be able to apply the parking brake in a secondary alternate operation if the normal actuating unit, i.e. the electric-motorized drive, is not functioning, the previously known parking brake arrangement additionally has a secondary alternate actuating unit which can apply torque to the guide element. For that purpose, the guide element has a contact surface for a pushrod, which is biased in normal operation by way of a pushrod spring, of the secondary alternate actuating unit. Also provided is a locking rod which, for fixing the spring-biased pushrod, engages in a recess of the pushrod. An electromagnetic stroke actuator of the secondary alternate actuating unit engages the end of the locking rod remote from the pushrod and, when energized, is capable of withdrawing the locking rod from the recess of the pushrod so as to release the pushrod, whereupon the latter rotates the guide element as a consequence of the force of the pushrod spring. This rotational movement of the guide element in turn makes possible a translational movement of the spring-biased tie rod so as to finally actuate the parking brake pawl. The electric motor unblocks the parking brake and compresses the pushrod spring of the secondary alternate actuating unit.

In order to make secondary alternate operation possible, a multiplicity of additional components is thus necessary in this prior art, which is due not least to the circumstance that a comparatively high level of torque has to be applied to the guide element so that the guide block travels past the top dead center of the guide track against the force of the spring element at the tie rod, whereupon the spring element acts on the tie rod firstly in the direction of blocking. In addition, a need for a large amount of installation space arises due to the number of additional components of the secondary alternate actuating unit and the relative position thereof necessary for the function. Finally, the required reverse operation of the electric motor also causes extra cost.

What is desired is an electric parking brake actuator, which is of as simple construction as possible, for actuation of a parking brake in a motor vehicle, which in the case of non-actuation of the electric motor enables a secondary alternate actuation of the parking brake by stored energy, at the same time is of more compact construction by comparison with the outlined prior art and avoids the disadvantages connected with reverse operation of the electric motor.

SUMMARY OF THE INVENTION

According to one aspect of the invention—an electric parking brake actuator for actuation of a parking brake in a motor vehicle includes a transmission mechanism which is accommodated in a housing and which is rotationally drivable by an electric motor and serves the purpose of conversion of a rotational movement into an axial movement of an actuating rod. The actuating rod is operatively connected with the transmission mechanism and carries an actuating element for the parking brake and which in normal operation is displaceable by way of the electric-motor-driven transmission mechanism from an unblocking position to a blocking position and vice versa. The actuating rod is biased by a spring element in the direction of the blocking position. A blocking mechanism is provided which serves the purpose of holding the actuating rod in the unblocking position of the actuating rod against the force of the spring element and for secondary alternate operation is selectably releasable by a locking device so that the actuating rod as a consequence of the force of the spring element moves into the blocking position without electric-motorized assistance. The blocking mechanism includes a blocking disc, which is in drive connection with the transmission mechanism and which in normal operation can be electric-motor-driven in a first direction of rotation and has a profile, which co-operates with the locking device and which in the first direction of rotation allows rotation of the blocking disc independently of the locking device and in a second, opposite direction of rotation forms a stop surface able to be brought into contact with the locking device when the blocking disc adopts a rotational position in which the actuating rod is disposed in the unblocking position of the actuating rod, wherein in secondary alternate operation the stop surface is releasable by the locking device so that the blocking disc rotates in the second direction of rotation to allow the actuating rod to move into the blocking position.

Due to the fact that the profile of the blocking disc co-operating with the locking device allows, in the first direction of rotation, rotation of the blocking disc independently of the locking device, the transmission mechanism in drive connection with the blocking disc can be continuously rotated onward by the electric motor in one and the same rotational direction of the electric motor. The actuating rod operatively connected with the transmission mechanism can move from the unblocking position of the actuating rod with assistance by the force of the spring element into the blocking position of the actuating rod and from there back against the force of the spring element into the unblocking position of the actuating rod, in which the spring element acts particularly as an energy store for secondary alternate operation. Accordingly, the electric motor in normal operation can displace the actuating rod and the actuating element, which is provided thereat, for the parking brake axially into all functional settings without any need for reverse operation of the electric motor for that purpose. Consequently, the electric motor can advantageously be optimized for single-quadrant operation, for which the electronic control system of the electric motor can also be of very simple construction. Moreover, any reversal play and disadvantages connected therewith such as, for example, increased wear in the transmission mechanism are avoided.

Only in the other, second direction of rotation of the blocking disc does the profile of the blocking disc form the stop surface for the locking device, by way of which the blocking disc can be kept in the unblocking position in non-energized state against the force of the spring element at the actuating rod. Therefore, merely the locking device has to be actuated to free the stop surface for secondary alternate operation, as a consequence of which the blocking disc rotates in the second direction of rotation due to the force of the spring element and the actuating rod thus shifts into its blocking position. By comparison with the relevant prior art it is not necessary to have previously overcome a dead center with expenditure of a greater amount of energy to be provided for secondary alternate operation, so that— apart from the locking device—additional components for the secondary alternate operation and the extra cost and greater need for installation space connected therewith are no longer needed. As a result, the parking brake actuator according to the invention can be of simpler and more compact construction by comparison with the known prior art.

In principle, it is possible to use a spur gear transmission or a worm transmission for the rotational speed conversion in the transmission mechanism. However, it is preferred if the transmission mechanism has a planetary transmission which converts the drive input rotational speed of the planetary transmission generated by the electric motor into a lower drive output rotational speed of the planetary transmission. A planetary transmission in which drive and drive output are in alignment advantageously has a very compact form of construction. With respect to a low drive torque of the electric motor and high rotational angle resolution yet with short dimensions the planetary transmission is preferably of two-stage configuration with a first transmission stage and a second transmission stage. In that regard it is additionally beneficial for a very compact construction of the parking brake actuator if the blocking disc is arranged between the first transmission stage and the second transmission stage.

Advantageously, the planetary transmission can comprise a ring gear integrally injection-molded with the housing of plastics material, which makes possible very economic production and in addition ensures a very low weight of the parking brake actuator. The planet wheels of the planetary transmission can also be made from plastic material, which can be easily and economically produced with straight toothings and are also sufficiently smooth-running as a consequence of the internal damping of the plastic material.

Various concepts are conceivable for conversion of the rotational movement of the electric motor into the axial movement of the actuating rod by the transmission mechanism. Thus, for example, a centrally driven cam can co-operate with the appropriately guided actuating rod. However, with respect to a simple constructional design with low outlay on guidance it is preferred if the transmission mechanism has a crank arm to which the actuating rod is eccentrically coupled. In the case of a planetary transmission for the rotational speed conversion a planetary carrier of the planetary transmission can advantageously form the crank arm.

The blocking disc can be produced in particularly simple manner as a precision punched part of steel or as an injection-molded part of a high-performance plastic. The profile is preferably formed at the outer circumference of the blocking disc—by contrast to, for example, an equally conceivable guide recess which is in the blocking disc and emanates from the front face. The stop surface of the profile has a radially inner edge and a radially outer edge with reference to an axis of rotation of the blocking disc, in which case the profile extends, as seen over the circumference of the blocking disc, between the radially inner edge and the radially outer edge of the stop surface at least partly in the form of an Archimedean spiral. The surface of the blocking disc profile co-operating with the locking device thus continuously and gently rises as seen in the first rotational direction over one revolution of the blocking disc starting from the stop surface until the stop surface is reached again as a consequence, higher levels of acceleration at the locking device in the release direction of the locking device are avoided and mass forces detrimental to smooth running are not generated.

The stop surface of the profile preferably extends at a slight inclination referred to a radial plane passing through the axis of rotation of the blocking disc, for example at an angle of 3° to 4°, so that the radially inner edge of the stop surface lies in front of the radially outer edge of the stop surface as seen in the sense of the first rotational direction of the blocking disc. Thus, by comparison with an equally conceivable radial orientation of the stop surface, advantageously only very small forces have to be exerted by the locking device in order to free the stop surface in secondary alternate operation for rotation of the locking disc in the second direction of rotation.

In principle it is possible to provide, as a locking device, a small spring-biased hydraulic piston-cylinder arrangement with a piston rod co-operating with the stop surface of the blocking disc or also only a pin which is spring-biased in direction of the profile at the blocking disc and which can be drawn away from the profile by way of a pull cable or the like in order to free the stop surface of the profile. However, with respect to, in particular, low costs and notional use of the parking brake actuator in a motor vehicle with at least in part an electric drive it is preferred if the locking device is a solenoid with an axially movable plunger which is surrounded by a coil fixed relative to the housing. The plunger has a contact end opposite the profile of the blocking disc and is biased by a biasing spring in the direction of the profile, in which case the contact end in a de-energized state of the coil bears against the profile so that it is capable of coming into engagement with the stop surface of the profile and in an energized state of the coil is drawn against the force of the biasing spring away from the profile so as to free the stop surface of the profile. Solenoids of that kind are economically and readily commercially available and have a favorable energy balance, since the electric control of the solenoid always takes place only very briefly, in particular when in secondary alternate operation of the parking brake actuator the stop surface of the blocking disc is to be freed so as to allow rotation, under the effective force of the spring element at the actuating rod, of the blocking disc in the second direction of rotation and thus axial displacement of the actuating rod into the blocking position. A further advantage of use of a solenoid lies in the fact that the inductance of the coil can be detected by an electronic system so as to determine the position of the plunger. Thus, positional information with respect to the locking device—locking or releasing the blocking disc can be obtained in simple mode and manner.

Advantageously, the housing of the parking brake actuator can in addition be provided integrally with a flange for securing to a transmission housing having a central opening through which the actuating rod, which carries the actuating element, and the spring element extend outwardly. The parking brake actuator can thus be externally flange-mounted in simple manner on the transmission housing. Separate mounting of components of the parking brake actuator in the transmission housing is not required.

The parking brake actuator in accordance with one aspect of the invention provides a small need for installation space as well as the possibility of simple mounting and connection of a parking brake actuator, which is preassembled and provided as a subassembly, at a transmission. It is also preferred if an electronic module is integrated in the housing of the parking brake actuator, which has at least one electronic system required for activation of the electric motor and an interface module for electrical contact-making with the parking brake actuator. The transmission mechanism can be separated in the housing from the electronic module by an intermediate cover which in turn is sealed off relative to the environment by an outer cover secured to the housing. Advantageously the intermediate cover can then also mount a bearing in the housing (double function of the intermediate cover), which in turn rotatably mounts a part of the transmission mechanism, for example the afore-mentioned crank arm, with low friction relative to the housing.

Finally, a sensor arrangement for positional detection of the actuating rod can also be integrated in the housing of the parking brake actuator advantageously in protected manner. The sensor arrangement includes a sensor element, which is provided in the electronic module, and a signal element, which in the region of the eccentric coupling of the actuating rod to the crank arm is connected with the actuating rod or the crank arm and detectable by the sensor element through the intermediate cover so as to detect at least the unblocking position and the blocking position of the actuating rod, in a given case also its stroke movement therebetween. This measure is also particularly conducive to a small installation space need of the parking brake actuator.

BRIEF DESCRIPTION OF THE DRAWINGS

The invention is explained in more detail in the following by way of a preferred embodiment with reference to the accompanying partly schematic drawings, in which.

DETAILED DESCRIPTION OF THE EMBODIMENT

Figure 1:
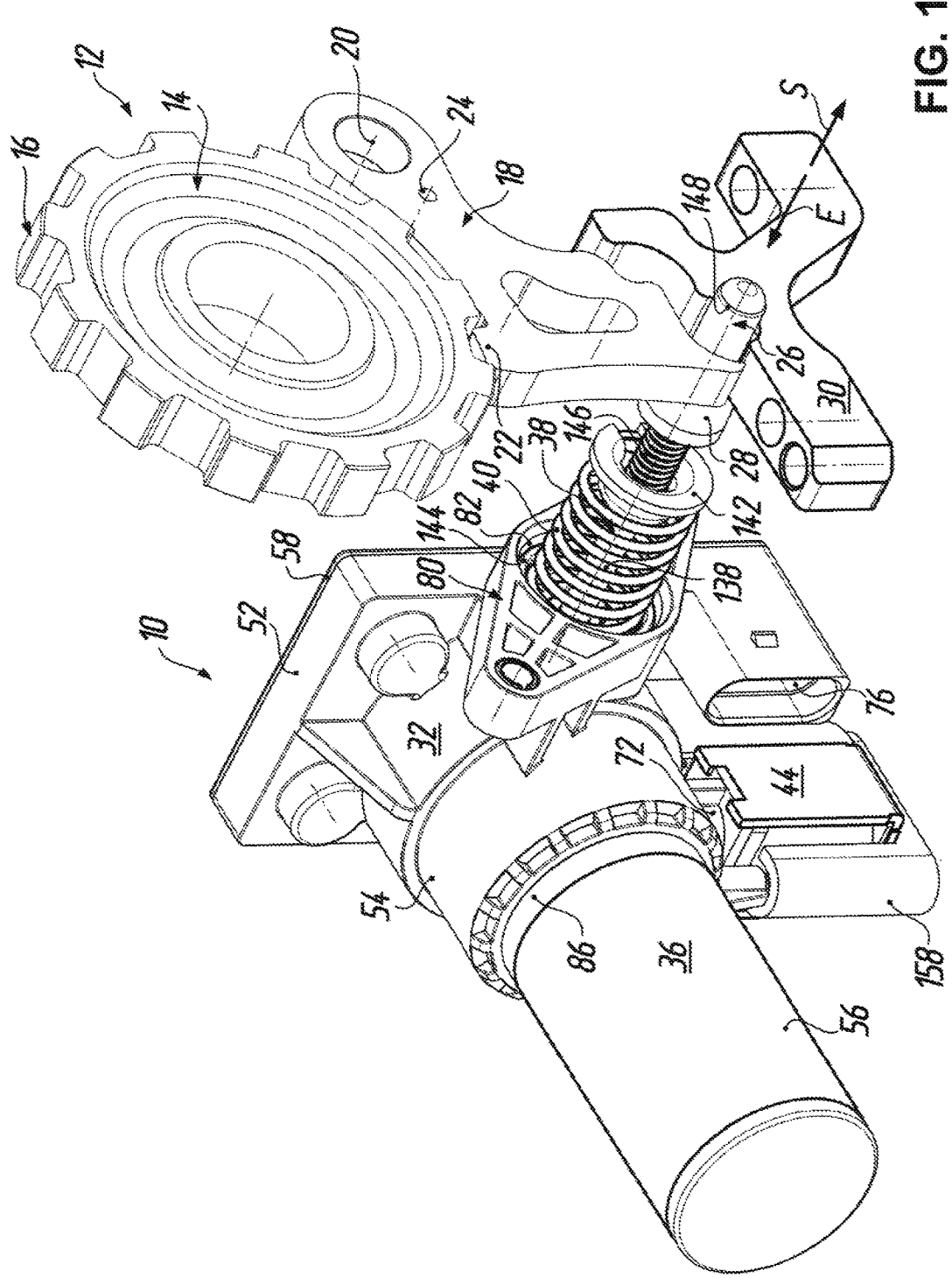
FIG. 1 shows a perspective view of an electric parking brake actuator according to one embodiment of the invention in its use position at a parking brake—which is shown here only schematically and which is actuable by way of an axially movable actuating rod of the parking brake actuator—obliquely from above and front right, with a view onto an electric motor, which is flange-mounted on a housing of the parking brake actuator, for normal operation of the parking brake actuator.

An electric-brake actuator for actuation of a parking brake 12 in a motor vehicle is denoted in the figures by the reference numeral 10. According to FIG. 1 the parking brake 12 includes, in a manner known per se, a parking brake wheel 14 which is arranged on a transmission shaft (not illustrated) of a motor vehicle transmission to be fixed rotationally and axially relative thereto and has a toothing 16 at the outer circumference. For mechanically positive locking of the drive train of the motor vehicle the parking brake 12 further includes a pawl 18, which is coupled to a transmission housing (not shown here) to be pivotable about a pivot axis 20 and which has a locking tooth 22 which when the pawl 18 is pivoted about the pivot axis 20 is capable of mechanically positive engagement with the toothing 16 of the parking brake wheel 14. The reference numeral 24 indicates a bore in the pawl 18, at which bore a return spring (not shown here) supported relative to the transmission housing engages, the spring biasing the pawl 18 away from the parking brake wheel 14 into an unblocked position.

Provided for pivotation of the pawl 18 about the pivot axis 20 is an actuating element 26 which in the illustrated embodiment has a (double) conical area section 28 and is axially displaceable in a manner, which is still to be described, by use of the parking brake actuator 10 selectably in a blocking direction S or an unblocking direction E, as indicated in FIGS. 1, 2, 11 to 14 and 16 by arrows. In that case, the conical area section 28 according to FIG. 1 is supported in a manner known per se on a cone guide element 30 fixed relative to a transmission housing, so that in the case of axial movement of the actuating element 26 in the blocking direction S the pawl 18 is rotationally raised in FIG. 1 about the pivot axis 20 against the force of the return spring (not illustrated) so as to bring the locking tooth 22 into mechanically positive engagement with the toothing 16 of the parking brake wheel 14. On the other hand, in the case of axial movement of the actuating element 26 in the unblocking direction E the conical area section 28 of the actuating element 26 is drawn out of its position between pawl 18 and cone guide element 30. Consequently, the pawl 18 is rotationally lowered in FIG. 1 about the pivot axis 20 due to the force of the return spring, in which case the locking tooth 22 comes out of engagement with the toothing 16 of the parking brake wheel 14.

Figure 2:
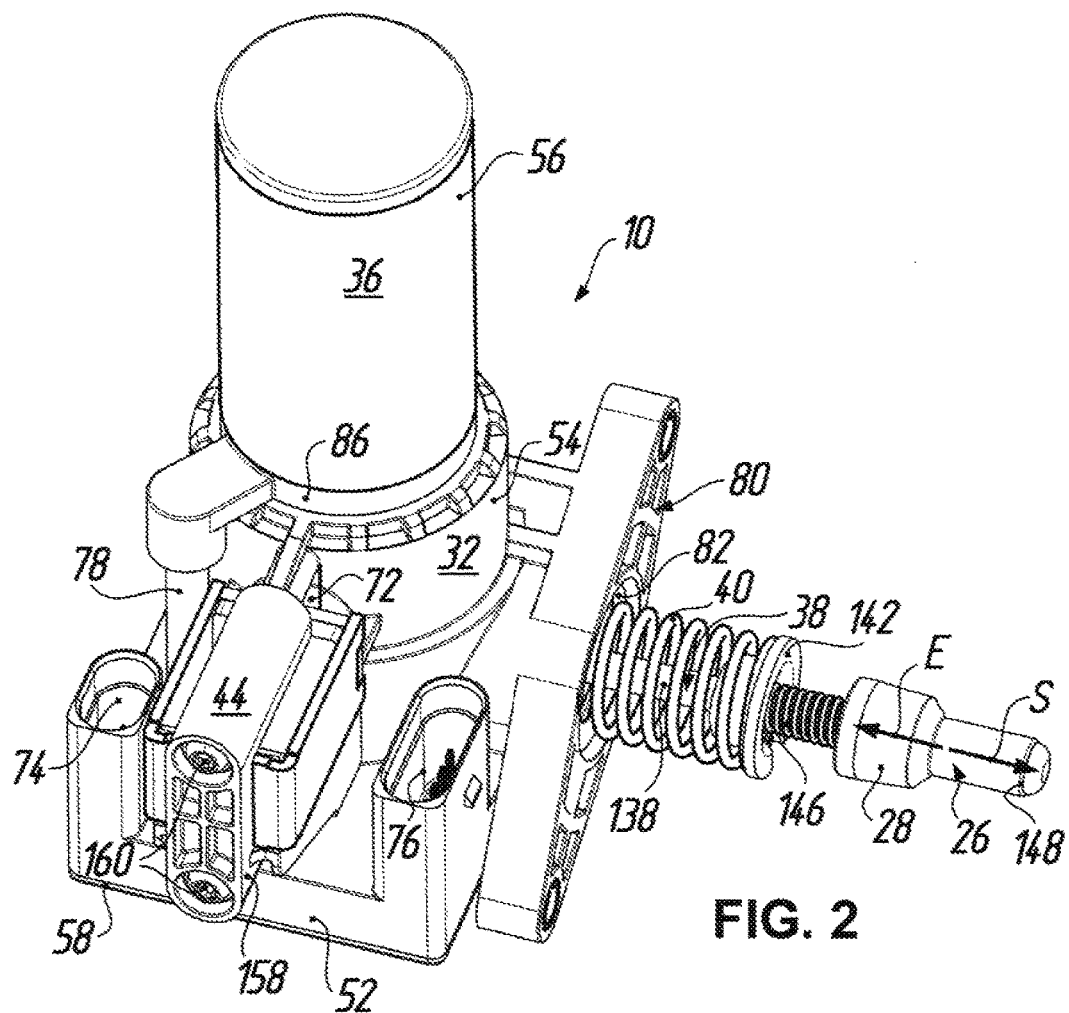
FIG. 2 shows a perspective view of the parking brake actuator according to FIG. 1 obliquely from above and front right, with a view onto an electromagnetic locking device, which is similarly secured to the housing, for secondary alternate operation of the parking brake actuator by an energy store in the form of a spring element biasing the actuating rod in the direction of the blocking position of the actuating rod.
Figure 3:
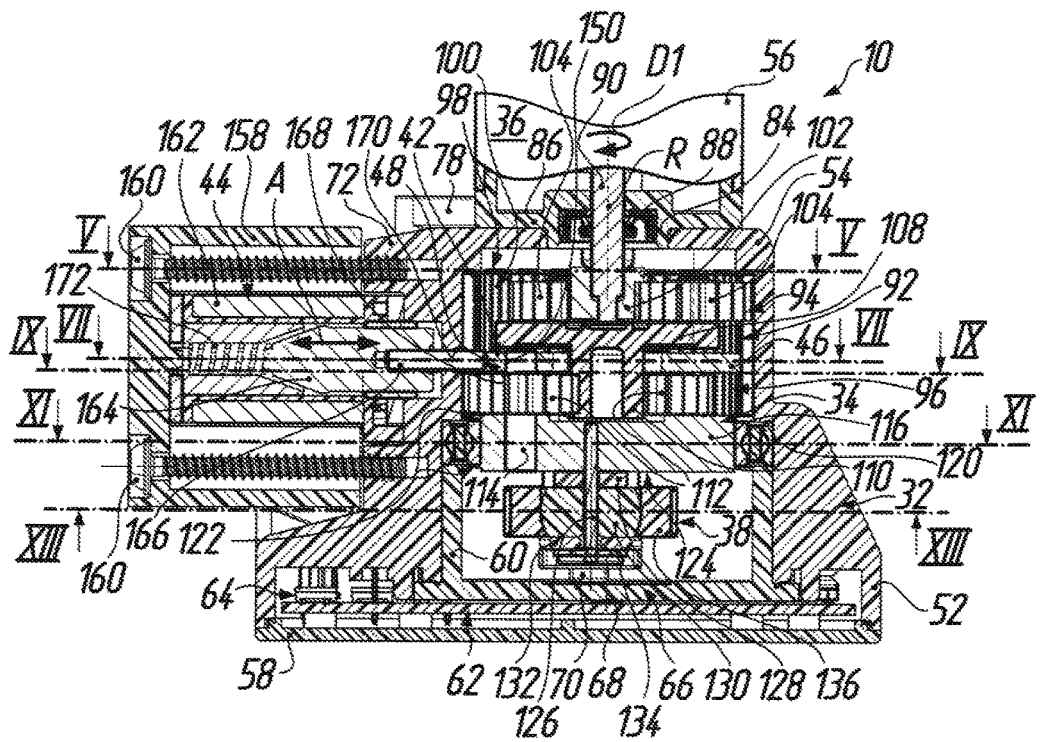
FIG. 3 shows a side view, which is broken away in the region of the electric motor and which is partly broken open along the center axes of the electric motor and the locking device as well as turned in clockwise sense in the plane of the drawing through 90°, of the parking brake actuator according to FIG. 1, wherein the moved parts of the parking brake actuator are disposed in the unblocking position of the moved parts in which the parking brake is not actuated.
Figure 4:
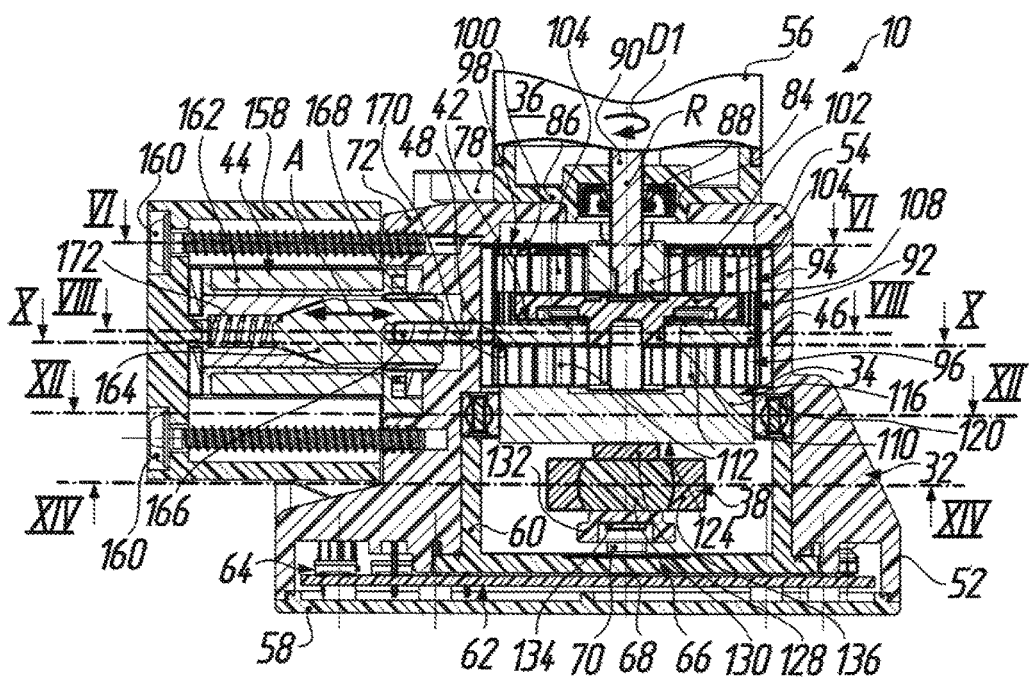
FIG. 4 shows a side view, which corresponds with respect to the broken-away and broken-open paths as well as the mode of illustration of FIG. 3, of the parking brake actuator according to FIG. 1, wherein the moved parts of the parking brake actuator are disposed in the blocking position of the moved parts in which the parking brake is actuated.
Figure 5:
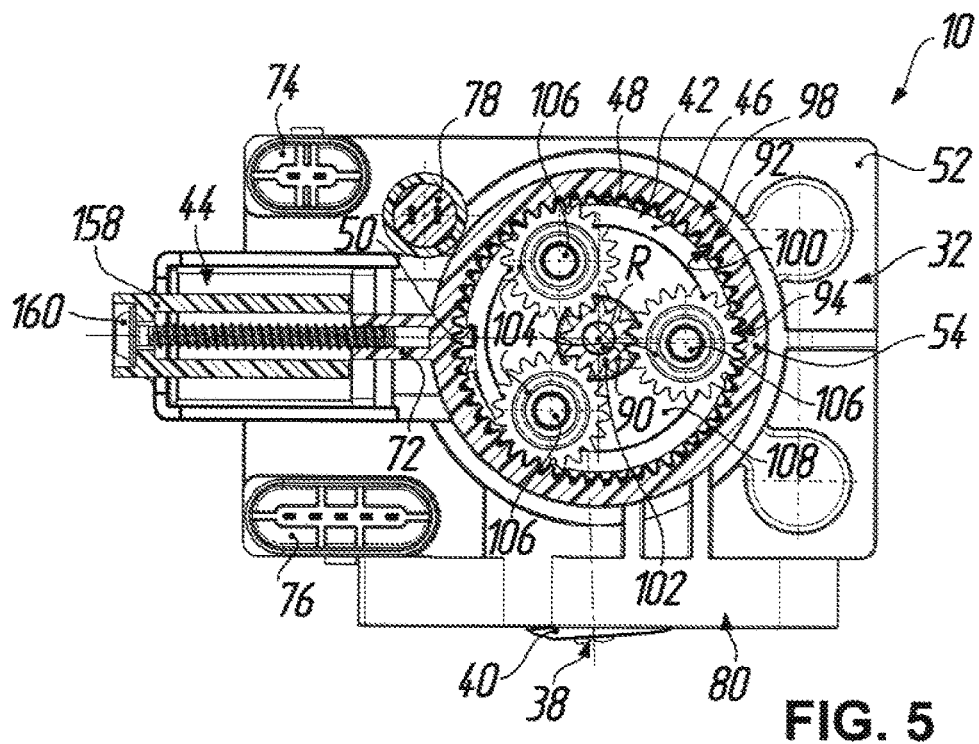
FIG. 5 shows a broken-away sectional view of the parking brake actuator according to FIG. 1 in correspondence with the section line V-V in FIG. 3, with a view onto a first transmission stage of a planetary transmission as a rotational speed converting subassembly of a transmission mechanism of the parking brake actuator, in the unblocking position.
Figure 6:
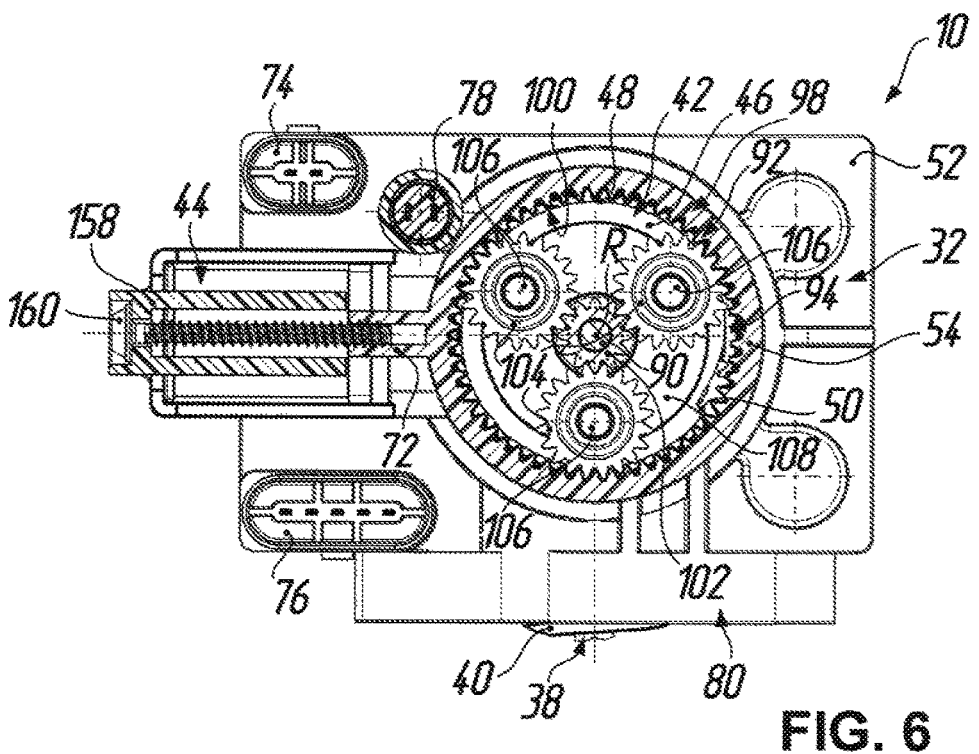
FIG. 6 shows a broken-away sectional view of the parking brake actuator according to FIG. 1 in correspondence with the section line VI-VI in FIG. 4, with a view onto the first transmission stage of the planetary transmission, in the blocking position.
Figure 13:
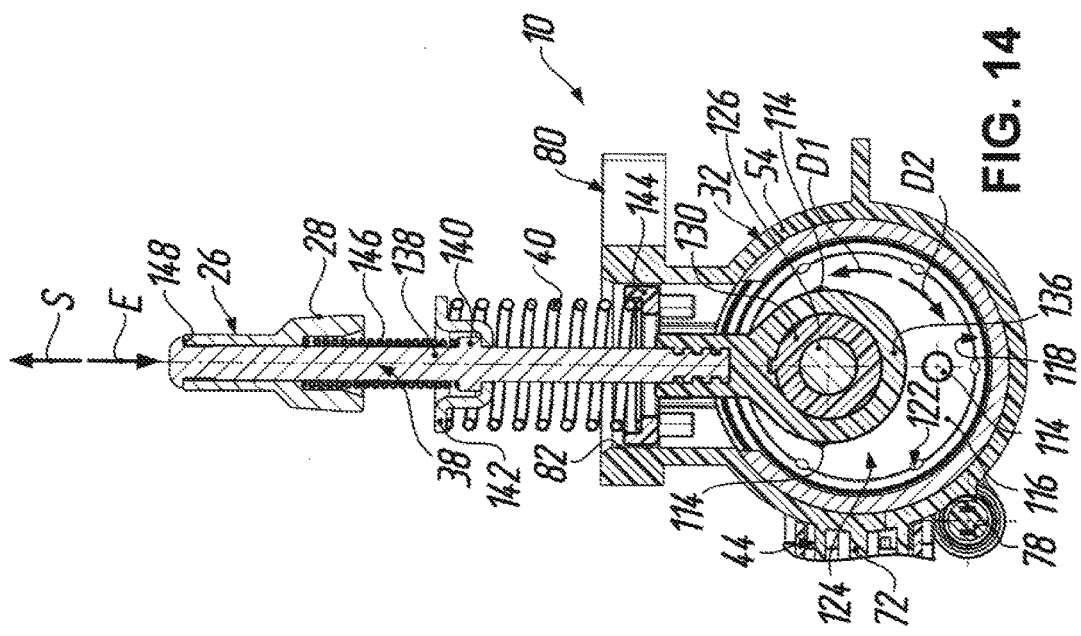
FIG. 13 shows a broken-away sectional view of the parking brake actuator according to FIG. 1 in correspondence with the section line XIII-XIII in FIG. 3, which runs centrally through the actuating rod eccentrically coupled to the crank arm, wherein the crank arm is disposed near its—here—bottom dead center or reversal point, while the actuating rod is disposed in the retracted unblocking position.
Figure 14:
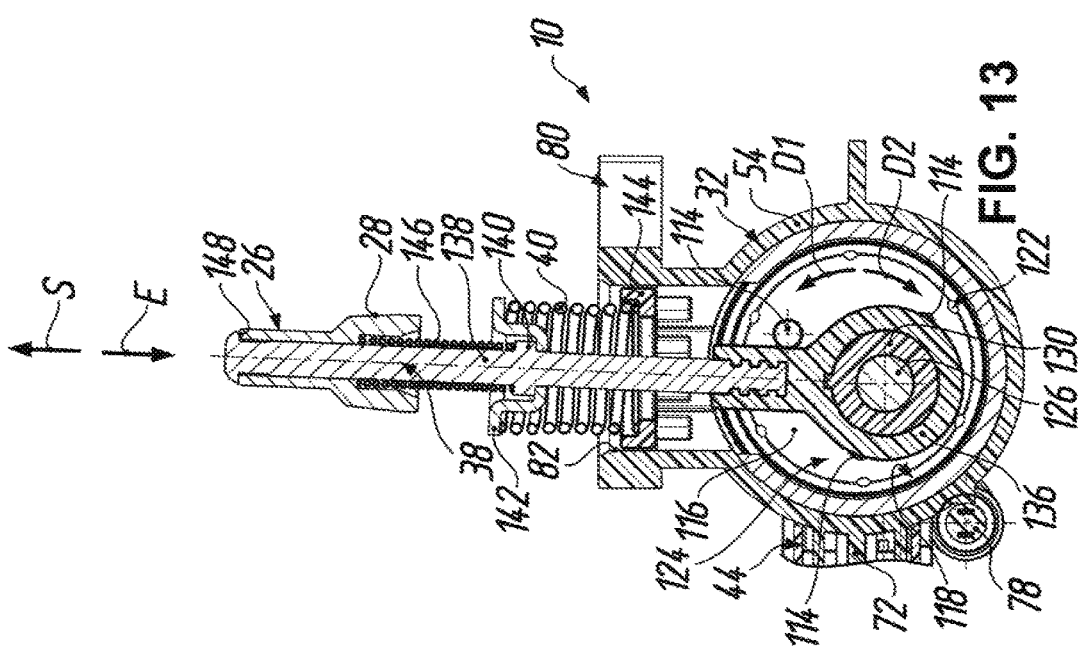
FIG. 14 shows a broken-away sectional view of the parking brake actuator according to FIG. 1 in correspondence with the section line XIV-XIV in FIG. 4, wherein the crank arm is disposed in its—here—top dead center or reversal point, while the actuating rod is disposed in the maximum extended blocking position.
Figure 16:
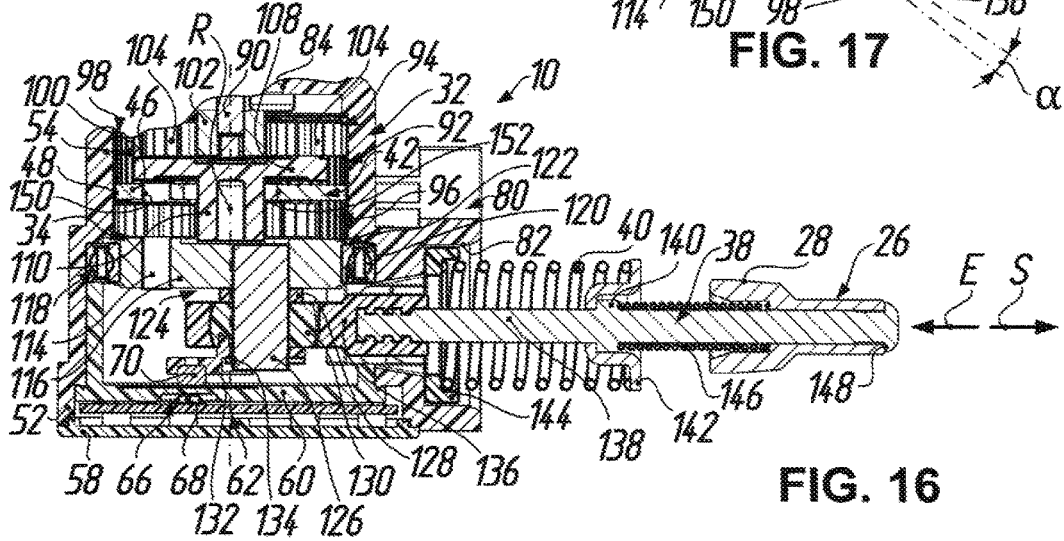
FIG. 16 shows an upwardly broken-away sectional view of the parking brake actuator according to FIG. 1 in correspondence with the section line XVI-XVI in FIG. 15, wherein the actuating rod is disposed in the maximum extended blocking position, particularly for illustration of a sensor arrangement, which is integrated in the housing, for positional detection of the actuating rod.

As shown in FIGS. 1 to 4 the parking brake actuator 10 includes a housing 32, which is preferably injection-molded from a plastic material and in which a transmission mechanism, which is generally denoted in FIGS. 3, 4 and 16 by the reference numeral 34, is received. The transmission mechanism can be rotationally driven by an electric motor 36, for example an inexpensive brush motor, externally flange-mounted on the housing 32 and serves the purpose of converting a rotational movement into an axial movement of an actuating rod 38 which is operatively connected with the transmission mechanism 34 and carries the actuating element 26 for the parking brake 12. In normal operation of the parking brake actuator 10 the actuating rod 38 can be displaced by way of the electric-motor-driven transmission mechanism 34 from a retracted unblocking position, which is shown in FIG. 13, in the blocking direction S into an extended blocking position, which is illustrated in FIGS. 14 and 16, and conversely, i.e. in the unblocking direction E. A spring element 40, here a helical compression spring, surrounding the actuating rod 38 in that case biases—as an energy store—the actuating rod 38 in the direction of the blocking position.

Moreover, as will be described in the following in more detail, a blocking mechanism 42 is provided (see FIGS. 3 to 8, 16 and 17) which serves the purpose of keeping the actuating rod 38 in the unblocking position of the actuating rod against the force of the spring element 40 and can, for secondary alternate operation, be selectably released by a locking device 44, so that the actuating rod 38 as a consequence of the force of the spring element 40 moves into the blocking position without electric-motorized assistance.

It is significant that the blocking mechanism 42 includes a drive disc 46 in drive connection with the transmission mechanism 34 (cf. again, in particular, FIGS. 3 to 8, 16 and 17), which in normal operation can be driven by electric motor in a first rotational direction D1 and, as will be similarly explained in more detail in the following, has a profile 48 which co-operates with the locking device 44 and which in the first rotational direction D1 allows rotation of the blocking disc 46 independently of the locking device 44 and in a second, opposite rotational direction D2 forms a stop surface 50 able to be brought into contact with the locking device 44 (see FIG. 7) when the blocking disc 46 adopts a rotational position in which the actuating rod 38 is disposed in its unblocking position. In the secondary alternate operation, i.e. in the case of non-operation of the electric motor 36, the stop surface 50 of the blocking disc 46 can be freed by the locking device 44 so that the blocking disc 46 rotates in the second rotational direction D2, while the spring-biased actuating rod 38 moves in the blocking direction S into the blocking position of the actuating rod.

As can already been seen from the outside in accordance with FIGS. 1 and 2, the housing 32 of the parking brake actuator 10 has a housing base 52, which is substantially rectangular as seen in plan view and from which a substantially cylindrical transmission housing 54 extends in the manner of a dome. A motor housing 56, which in the illustrated embodiment is separate from the housing 32 of the parking brake actuator 10 and is partly made from plastic material is flange-mounted on the end of the transmission housing section 54 remote from the housing base 52. The housing 32 is closed at the side remote from the motor housing 56 by an outer cover 58 of plastics material, the cover 58 being laser-welded in liquid-tight manner to the housing base 52.

A substantially cup-shaped intermediate cover 60 of plastic material is inserted into the housing 32 between the housing base 52 and the transmission housing section 54. As shown in FIGS. 3, 4 and 16, the intermediate cover 60 divides the interior space of the housing 32 into two regions that are similarly sealed (for example by laser welding). Whereas—as the name already implies—the suitably lubricated transmission mechanism 34 and the blocking mechanism 42 are accommodated in the region of the transmission housing 54, the housing base 52 serves for dry accommodation of an electronic module 62 integrated in the parking brake actuator 10. The electronic module 62 has at least one electronic system, which is required for activation of the electric motor 36, and an interface module 64 (cf. FIGS. 3 and 4) for electrical contact-making with the parking brake actuator 10.

In addition, as shown in in particular, FIG. 16 a sensor arrangement 66 for positional detection of the actuating rod 38 is also integrated in the housing 32. The sensor arrangement 66 comprises a stationary sensor element 68 (for example a Hall sensor) and a signal element 70 (magnet) provided in the electronic module 62. The signal element is movably arranged in the region of the transmission mechanism 34 together with the actuating rod 38 and detection can take place by the sensor element 68 through the intermediate cover 60 so as to detect at least the unblocking position and the blocking position of the actuating rod 38.

As shown in FIGS. 1 and 2 a terminal region 72 for the locking device 44 is provided laterally at the transmission housing section 54 of the housing 32, the locking device in the illustrated embodiment being a solenoid, thus an electromagnetic actuator. In addition, it can be seen in FIGS. 1 and 2 that the housing 32 in the region of the housing base 52 is provided with electrical terminals 74, 76, which extend away from the housing base 52 in parallel to the transmission housing section 54, for electrical contact-making with the parking brake actuator 10 by way of the electronic module 62. Whereas the electrical terminal 74 at the left in FIG. 2 serves for independent electrical activation of the locking device 44, the electrical terminal 76 on the right in FIG. 2 is provided for electrical contact-making with the electric motor 36 and the sensor arrangement 66. Moreover, in FIG. 2 there can be seen a connecting section 78 which extends from the housing base 52 to the motor housing 56 and by way of which the electronic module 62 is electrically connected with the electric motor 36.

Figure 15:
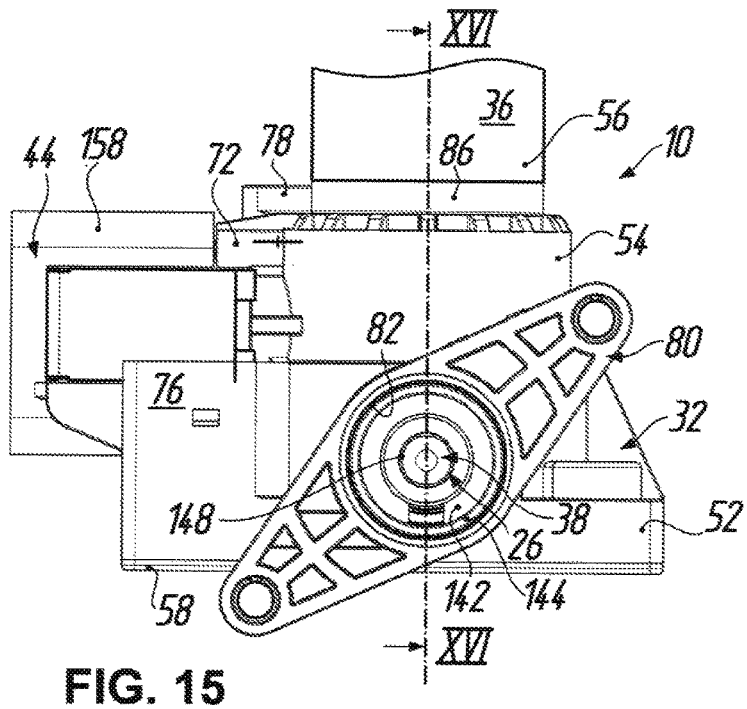
FIG. 15 shows a side view, which is turned in clockwise sense in the plane of the drawing through 90° and is broken away at the top, of the parking brake actuator according to FIG. 1, with a view onto a flange, which is formed integrally at the housing, for securing to a transmission housing.

Finally, it can also be seen in FIGS. 1, 2 and 15 that the housing 32 is provided, offset about the center axis of the housing 32 by 90° with respect to the terminal region 72 for the locking device 44, with a flange 80 for securing to the transmission housing (not illustrated). The flange 80 has a central opening 82 through which the actuating rod 38, which carries the actuating element 26, and the spring element 40 extend outwardly.

With respect to the interior of the parking brake actuator 10, reference shall initially be made to FIGS. 3, 4 and 16. According to those, the transmission housing 54 is provided at its closure wall, which is at the top in these figures, with a central opening 84 at which a securing flange 86 of the motor housing 56 is centered and secured in a manner which is not shown here. A radial shaft sealing ring 88, through which a drive output shaft 90 of the electric motor 36 extends in sealed manner into the transmission housing section 54 so as to rotationally drive the transmission mechanism 34, is received in a cylindrical cut-out of the securing flange 86. In the illustrated embodiment the transmission mechanism 34 generally includes two subassemblies, namely a first subassembly, which serves the purpose of converting the drive input rotational speed with lower torque that is generated by the electric motor 36—into a lower drive output rotational speed with higher torque, and a second subassembly, where the rotational movement of the first subassembly is converted into the axial movement of the actuating rod 38.

In the present embodiment the first subassembly of the transmission mechanism 34 is a planetary transmission 92 of two-stage configuration, which includes a first transmission stage 94 and a second transmission stage 96. A ring gear 98, which is fixed relative to the housing and which is injection-molded from plastic material integrally with the transmission housing section 54 of the housing 32 and has a straight toothing 100, is common to the two coaxially arranged transmission stages 94, 96 of the planetary transmission 92. A straight-toothed first sun pinion 102 of the first transmission stage 94 is secured to the end of the drive output shaft 90 projecting into the transmission housing section 54 and, according to FIGS. 5 and 6, meshes with three straight-toothed first planet wheels 104 uniformly angularly spaced from one another about the axis R of rotation. According to FIGS. 5 and 6 the first planet wheels 104, which are similarly injection-molded from plastic material and which are shown unsectioned in FIGS. 3, 4 and 16, are rotatably mounted on a first planetary carrier 108 by cylinder pins 106 and in turn mesh with the ring gear 98.

A straight-toothed second sun pinion 110 of the second transmission stage 96 is injection-molded from plastic material integrally with the first planetary carrier 108 on the side of the first planetary carrier 108 remote from the first sun pinion 102 and, according to FIGS. 7 to 10, meshes with three straight-toothed second planet wheels 112 uniformly angularly spaced from one another about the axis R of rotation. According to FIGS. 9 and 10, the second planet wheels 112, which are similarly injection-molded from plastic material and which are illustrated unsectioned in FIGS. 3, 4 and 16, are rotatably mounted on a metallic second planetary carrier 116 by cylinder pins 114 and in turn mesh with the ring gear 98.

The second planetary carrier 116 is mounted at the outer circumference of the second planetary carrier by a bearing 118, which is shown merely schematically in the figures, in the form of a roller bearing in the transmission housing 54, wherein the intermediate cover 60 holds an outer ring of the bearing 118 on a step 120 in the housing 32. An inner ring of the bearing 118 is in that case positionally fixed at both faces to the second planetary carrier 116 at a plurality of points distributed over the circumference, as indicated by way of example by the reference numeral 122 in FIGS. 3, 9, 10, 13, 14 and 16, as a result of which the second planetary carrier 116 is held in axial direction in the transmission housing section 54 by way of the bearing 118.

Rotation of the drive output shaft 90 of the electric motor 36 in the first transmission stage 94 by way of the first sun pinion 102, the first planet wheels 104 and the cylinder pins 106 is transmitted to the first planetary carrier 108 with step-down translation, because the ring gear 98 with its toothing 102 is fixed relative to the housing. By contrast, the planetary carrier 108 rotates the second sun pinion 110, which is integrally connected therewith, of the second transmission stage 96, the rotation of which is transmitted—again with step-down translation—to the second planetary carrier 116 by way of the second planet wheels 112, which equally roll on the ring gear 98, and the cylinder pins 114. Since the planetary transmission 92 is two-stage, the drive output shaft 90 of the electric motor 36 and the second planetary carrier 116 rotate in the same sense about the axis R of rotation. The overall translation ratio can in that case lie in a range between approximately 12:1 and 30:1, for example at 24:1, i.e. 24 revolutions of the drive output shaft 90 of the electric motor 36 in this example produce by way of the two-stage planetary transmission 92 one revolution of the second planetary carrier 116. Since the overall translation of multi-stage transmissions results from multiplication of the translations of the individual transmission stages, it is possible to select for each of the transmission stages 94, 96 a feasible translation range between approximately 3:1 and 10:1, so that the sun pinions and the planet wheels are not very small and can be readily produced from high-performance plastic materials.

In the present embodiment the afore-mentioned second subassembly of the transmission mechanism 34, by which the rotational movement of the planetary transmission 92 is converted into the axial movement of the actuating rod 38, is an eccentric drive with a crank arm 124 to which the actuating rod 38 is eccentrically coupled. In that case, the second planetary carrier 116 of the planetary transmission 92 at the same time forms the crank arm 124. As can be best seen in FIGS. 13, 14 and 16, a cylinder pin 126 is mounted on the second planetary carrier 116 eccentrically with respect to the axis R of rotation, for example by a press connection, so that the cylinder pin 126 protrudes from the second planetary carrier 116 on the side remote from the planetary transmission 92.

A thrust washer 128, a spherical bearing part 130 and a mount 132 for the signal element 70 (magnet) of the sensor arrangement 66—all components of plastic—are plugged onto the cylinder pin 126 from the top to the bottom as seen, for example, in FIG. 16 and are secured by a securing ring 134 at the end, which is lower in FIG. 16, of the cylinder pin 126. As can be seen in FIG. 16, the mount 132 is mechanically positively secured to the spherical bearing part 130—which particularly for mounting purposes allows a slight pivotation of the actuating rod 38 out of the drawing plane of FIGS. 13 and 14—against rotation with respect to the spherical bearing part 130, while the spherical bearing part 130 according to FIGS. 13 and 14 for its part is mechanically positively secured to a bearing eye 136 of the actuating rod 38 against rotation with respect to the bearing eye 136. The bearing eye 136, which is clipped onto the spherical bearing part 130, similarly is made from plastic and is injection-molded on a metallic rod core 138 of the actuating rod 38. The mount 132 for the signal element 70 thus follows, always in alignment with the actuating rod 38, a reciprocating pivotal movement of the actuating rod 38 about the cylinder pin 126, which in turn orbits the axis R of rotation when the crank arm 124 rotates. As a result, the respective position of the actuating rod 38 due to the relative movement produced between the sensor element 68 and the signal element 70, which is connected with the actuating rod 38 in the region of the eccentric coupling of the actuating rod 38 to the crank arm 124, is readily detectible by the sensor arrangement 66 through the intermediate cover 60.

Further details with respect to the actuating rod 38 and the biasing of the actuating rod can be inferred from, in particular, FIGS. 1, 2, 13, 14 and 16. According to those, the rod core 138 of the actuating rod 38 is provided substantially centrally with a collar 140 for fulfilling a double counter-bearing function. On the one hand, the collar 140 forms a counter-bearing for a metallic spring plate 142, on which the spring element 40 is supported at the rod side, while the spring element 40 is supported at the housing side by way of a centering ring 144 of plastic received in the opening 82 of the flange 80. The spring element 40 thus biases the actuating rod 38 in the blocking direction S. On the other hand, the collar 140 forms a counter-bearing for an advancing spring 146 in the form of a helical compression spring, the function of which has already been described in the introduction. The advancing spring 146 is plugged onto the rod core 138 at the side of the collar 140 remote from the spring element 40 and biases the actuating element 26, which is guided on the rod core 138 to be axially movable, in blocking direction S against a stop 148 formed at the free end of the rod core 138.

With respect to further details of the blocking mechanism 42 reference may be made in the first instance to FIGS. 3, 4 and 16. According to those, the blocking disc 46 of the blocking mechanism 42 is arranged axially between the first transmission stage 94 and the second transmission stage 96, more precisely between the first planetary carrier 108 of the first transmission stage 94 and the second planet wheels 112 of the second transmission stage 96. In that case, the blocking disc 46 is coupled to the second planetary carrier 116 of the second transmission stage 26 to be secure against relative rotation and, in particular, by way of the cylinder pins 114, which mount the second planet wheels 112 and which in FIGS. 3, 4 and 16 project upwardly beyond the second planet wheels 112 and there engage in respectively associated bores 150 in the blocking disc 46; with respect thereto see, in particular, FIGS. 7 and 8. It can also be readily seen in these figures that the blocking disc 46 is annular, with a central opening 152 for passage of the second sun pinion 110 of the second transmission stage 96.

Figure 7:
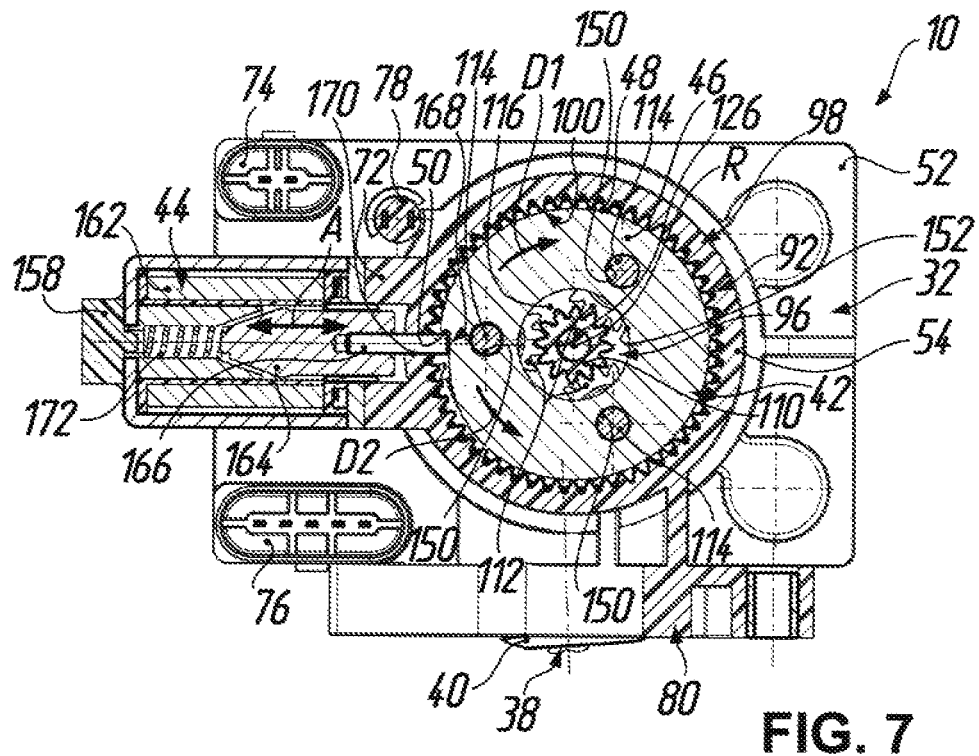
FIG. 7 shows a broken-away sectional view of the parking brake actuator according to FIG. 1 in correspondence with the section line VII-VII in FIG. 3, which runs centrally through the locking device, for illustration of how the locking device co-operates with a blocking disc, which is in drive connection with the transmission mechanism, of a blocking mechanism, the blocking disc serving the purpose of keeping the actuating rod for emergency operation in its unblocking position against the force of the spring element, wherein the blocking disc—fixed by the locking device at a stop surface of a profile of the blocking disc—is disposed in the unblocking position.
Figure 8:
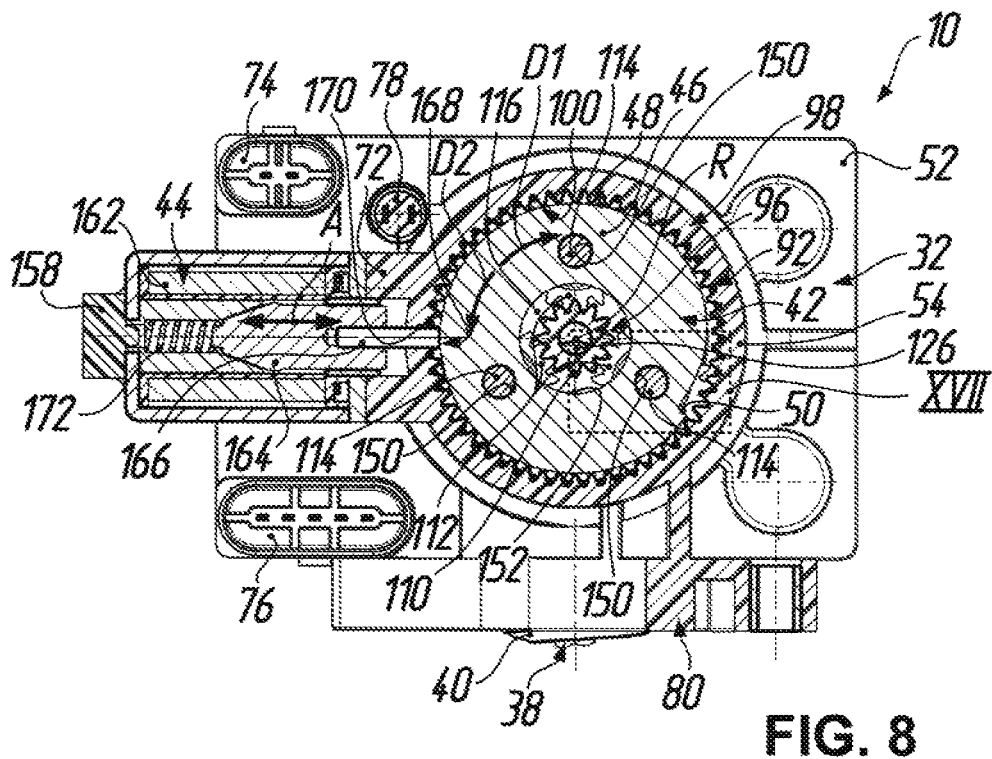
FIG. 8 shows a broken-away sectional view of the parking brake actuator according to FIG. 1 in correspondence with the section line VIII-VIII in FIG. 4, wherein the blocking disc—released by the locking device—is disposed in the blocking position.
Figure 9:
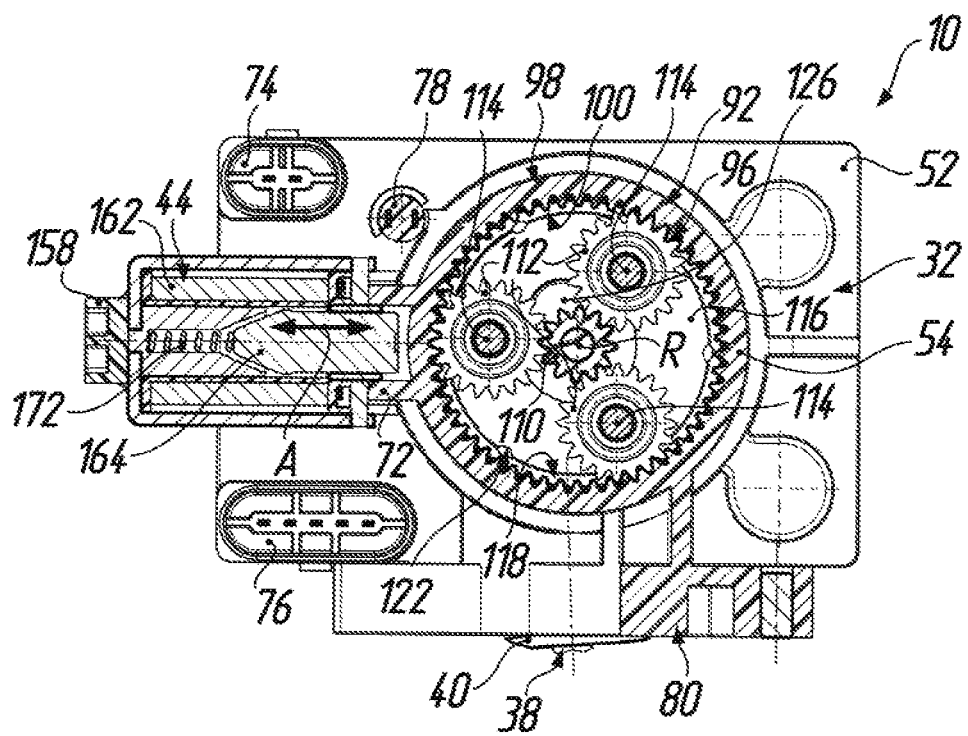
FIG. 9 shows a broken-away sectional view of the parking brake actuator according to FIG. 1 in correspondence with the section line IX-IX in FIG. 3, with a view onto a second transmission stage of the planetary transmission in the unblocking position.
Figure 10:
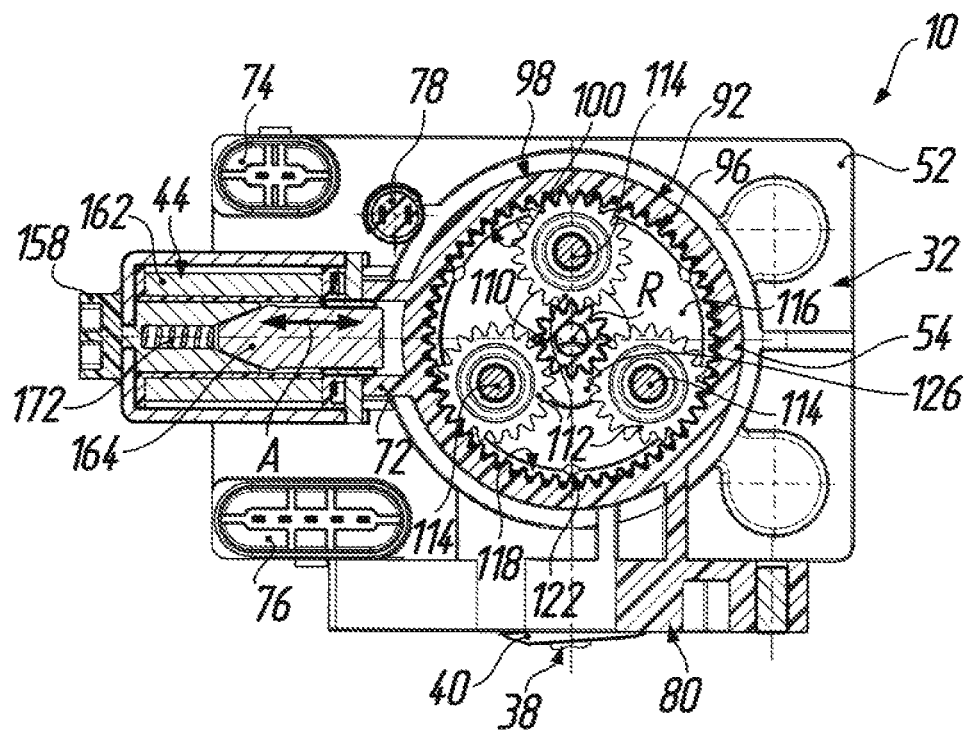
FIG. 10 shows a broken-away sectional view of the parking brake actuator according to FIG. 1 in correspondence with the section line X-X in FIG. 4, with a view onto the second transmission stage of the planetary transmission in the blocking position.
Figure 11:
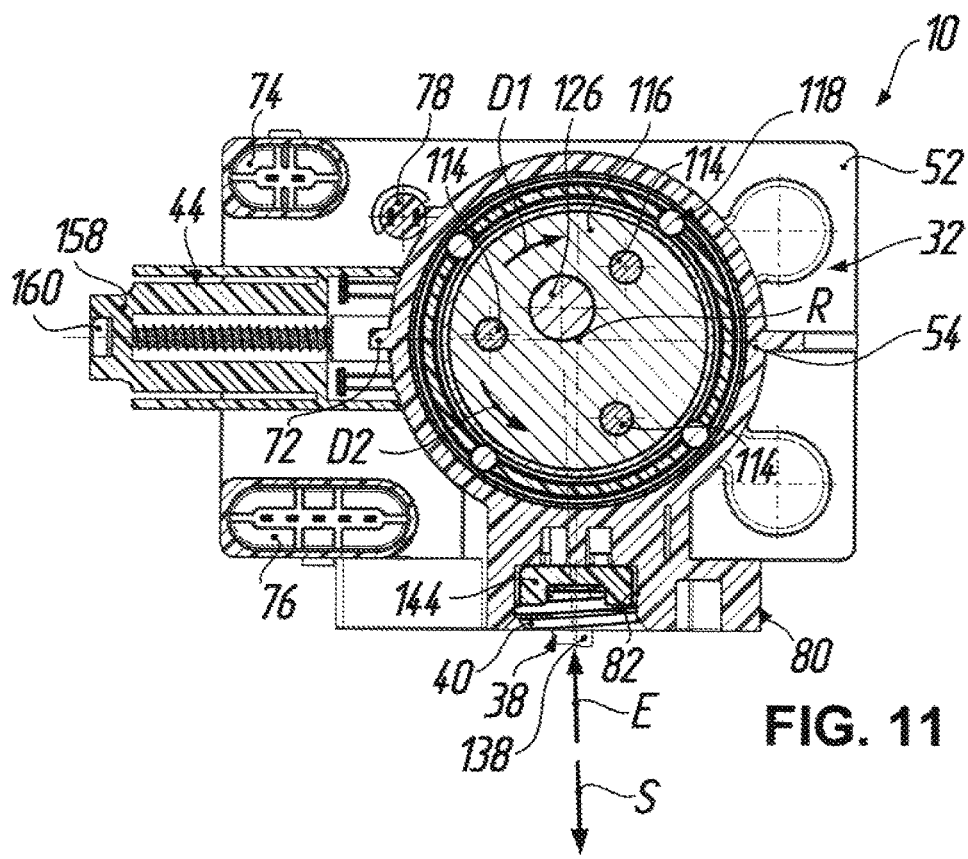
FIG. 11 shows a broken-away sectional view of the parking brake actuator according to FIG. 1 in correspondence with the section line XI-XI in FIG. 3 running centrally through a crank arm, which is rotatably mounted centrally in the housing by a bearing (shown merely schematically), of the transmission mechanism, to which the actuating rod is eccentrically coupled in order to convert a rotational movement of the planetary transmission into an axial movement of the actuating rod, wherein the crank arm is disposed in the unblocking position near its—here—top dead center or reversal point.
Figure 12:
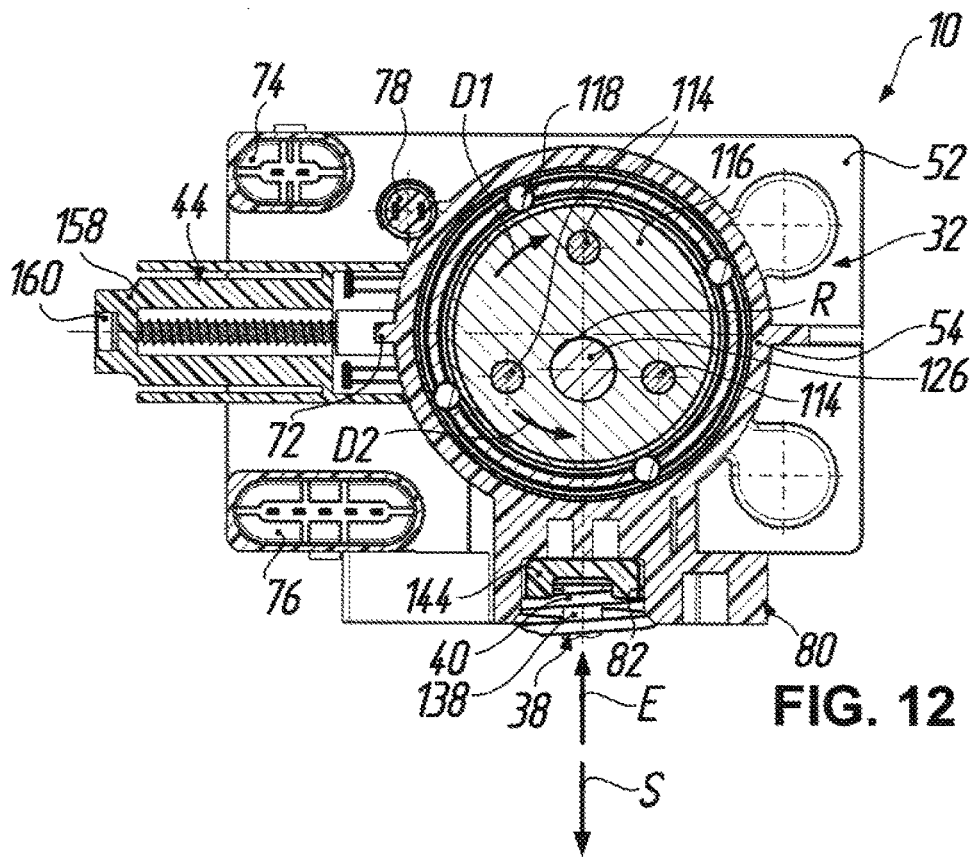
FIG. 12 shows a broken-away sectional view of the parking brake actuator according to FIG. 1 in correspondence with the section line XII-XII in FIG. 4, wherein the crank arm is disposed in the blocking position in its—here—bottom dead center or reversal point.
Figure 17:
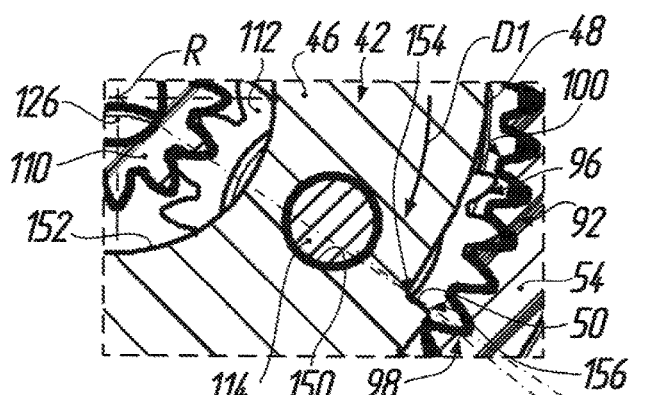
FIG. 17 shows a part sectional view, which is to an enlarged scale, of the parking brake actuator according to FIG. 1 in correspondence with the detail XVII in FIG. 8, for better illustration of an inclined position of the stop surface of the profile of the blocking disc referred to the radial direction with respect to the axis of rotation of the blocking disc.

According to FIGS. 7, 8 and 17 the profile 48, which co-operates with the locking device 44, of the blocking mechanism 42 is formed at the outer circumference of the blocking disc 46. As, in particular, the enlargement according to FIG. 17 shows, the stop surface 50 of the contour 48 in that case has, referred to the axis R of rotation of the blocking disc 46, a radially inner edge 154 and a radially outer edge 156. As seen over the circumference of the blocking disc 46 the profile 48 extends between the radially inner edge 154 and the radially outer edge 156 at least partly in the form of an Archimedean spiral.

As already mentioned further above, the blocking device 44 co-operating with the profile 48 of the blocking disc 46 is a solenoid. According to FIGS. 2 to 6, 11 and 12, a solenoid housing 158 is secured by securing screws 160 and suitably sealed to the connecting region 72 of the transmission housing section 54. As shown in FIGS. 3, 4 7 and 8, an axially movable plunger 164 surrounded by a coil 162 fixed relative to the housing is received in a manner known per se in the solenoid housing 158. Mounted at the plunger 164 is a cylinder pin 166 forming a contact end 168, which is opposite the profile 48 of the blocking disc 46 and which protrudes into the transmission housing section 54 through an associated opening 170 therein in order to come into contact with the profile 48. In addition, a biasing spring 172 biasing the plunger 164 in the direction of the profile 48 is provided. Accordingly, the contact end 168 in a non-conducting state of the coil 162 bears against the profile 48 so that it is capable of coming into engagement with the stop surface 50 of the profile 48, while the contact end 168 in a conducting state of the coil 162 is drawn away from the profile 48 against the force of the biasing spring 172 so as to free the contact surface 50 of the profile. This axial movement of the plunger 164 is indicated in FIGS. 3, 4 and 7 to 10 by a double arrow A.

The angular positions, which are to be provided around the axis R of rotation, of the stop surface 50 of the profile 48 on the one hand and the cylinder pin 126 for eccentric coupling of the actuating rod 38 to the crank arm 124 on the other hand are so matched to one another (see FIGS. 7 and 13) that when the contact end 168 of the locking device 44 bears against the stop surface 50 of the profile 48, as shown in FIG. 7, the cylinder pin 126 at the crank arm 124 is disposed near its point of reversal at the bottom in FIG. 13 and, in particular, in front of the point of reversal as seen in the first rotational direction D1. The actuating rod 38 as a consequence of the force of the biased spring element 40 is thereby capable of exerting a torque in the second direction D2 of rotation by way of the cylinder pin 126 at the crank arm 124. If starting from this position the stop surface 50 of the profile 48 in secondary alternate operation of the parking brake actuator 10 is released, through application of current to the locking device 44, from the contact end 168 of the locking device, the crank arm 124 and thus the blocking disc 46 rotate under the stored force of the spring element 40 in the second rotational direction D2, in which case the actuating rod 38 moves out of the unblocking position of the actuating rod according to FIG. 13 in the blocking direction S into the blocking position of the actuating rod according to FIG. 14. In order that the electric motor 36 does not have to be rotated therewith in this movement, an appropriate freewheel (not illustrated) can be provided at the drive output shaft 90 of the electric motor 36. By contrast, in normal operation of the parking brake actuator 10 the rotation of the electric motor produces by way of the transmission mechanism 34 a rotation of the crank arm 124 and thus the blocking disc 46 in the first direction D1 of rotation. The profile 48 gently rising towards the radially edge 156 of the stop surface 50, as seen in circumferential direction of the blocking disc 46, starting from the radially inner edge 154 of the stop surface 50 in that case pushes the plunger 164 of the locking device 44 by way of the contact end 168 of the plunger away to the left in FIGS. 7 and 8 against the force of the biasing spring 172. On travelling over the stop surface 50 the contact end 168 of the plunger 164 is pushed back onto the profile 48 under the force of the biasing spring 172. Accordingly, in the first rotational direction D1 the stop surface 50 cannot provide any action locking the blocking disc 46, but can in the second rotational direction D2.

It will be apparent that in normal operation of the parking brake actuator 10 the actuating rod 38 can be brought into its blocking position by the electric motor 36 with the assistance of the force of the spring element 40. For secondary alternate operation, the spring element 40 is biased and the transmission mechanism 34 blocked by the blocking mechanism 42 and the associated locking device 44. In the second rotational direction D2 the stop surface 50 prevents rotation of the transmission mechanism 34 under the force of the spring element 40. The transmission mechanism 34 cannot automatically rotate in the first rotational direction D1, because the crank arm 124 is disposed in front of the reversal point of the crank arm as seen in the first direction D1 of rotation, for which reason the spring element 40 acts in the second direction D2 of rotation and urges the stop surface 50 against the locking device 44. Merely application of current to the locking device 44 is now needed in order to release the stop surface 50 and thus enable rotation of the transmission mechanism 34 in the second direction D2 of rotation, whereupon the spring element 40 pushes the actuating rod 38 into its blocking position. Needed for return movement of the actuating rod 38 into the unblocking position of the actuating rod is the electric motor 36, which drives the transmission mechanism 34 in the first direction D1 of rotation so as to retract the actuating rod 38 and in that case also tension the spring element 40 again.

Finally, in FIG. 17 it is illustrated that the stop surface 50 of the profile 48 at the blocking disc 46 extends at a slight inclination referred to a radial plane extending through the axis R of rotation of the blocking disc 46, so that the radially inner edge 154 of the stop surface 50 as seen in the direction of the first rotational direction D1 of the blocking disc 46 lies in front of the radially outer edge 156 of the stop surface 50. The corresponding angle α of inclination of the stop surface 50 can be, for example, between 3° and 4°. This inclination of the stop surface 50 facilitates drawing of the contact end 168 of the plunger 164 away from the profile 48 when the locking device 44 conducts current so as to free the stop surface 50.

An electric parking brake actuator has a transmission mechanism, which is accommodated in a housing and is rotationally drivable by an electric motor and which serves the purpose of converting a rotational movement into an axial movement of an actuating rod, which is operatively connected with the transmission mechanism and carries an actuating element for the parking brake. The actuating rod in normal operation is displaceable from an unblocking position to a blocking position and conversely in electric-motorized manner by way of the transmission mechanism and is biased by a spring element in the direction of the blocking position. A blocking mechanism serves the purpose of holding the actuating rod in the unblocking position of the actuating rod against the force of the spring element acting as an energy store and has for that purpose, in a very compact mode of construction, a blocking disc, which is in drive connection with the transmission mechanism, with a profile which forms a stop surface for a locking device in only one rotational direction of the blocking disc. The abutment surface is releasable by the locking device for secondary alternate operation so that the actuating rod as a consequence of the force of the spring element moves into the blocking position without electric-motorized assistance.

The invention claimed is:

1. An electric parking brake actuator for actuation of a parking brake in a motor vehicle, comprising:
    a transmission mechanism which is accommodated in a housing and which is rotationally drivable by an electric motor and serves the purpose of conversion of a rotational movement into an axial movement of an actuating rod;
    said actuating rod is operatively connected with the transmission mechanism and carries an actuating element for the parking brake and which in a normal operation is displaceable by way of the electric-motor-driven transmission mechanism from an unblocking position to a blocking position and conversely and is biased with a biasing force by a spring element in the direction of the blocking position;
    wherein a blocking mechanism is provided which serves the purpose of holding the actuating rod in the unblocking position of the actuating rod against the biasing force of the spring element and for a secondary alternate operation is selectably releasable by a locking device so that the actuating rod as a consequence of the biasing force of the spring element moves into the blocking position without electric-motorized assistance, characterized in that the blocking mechanism comprises a blocking disc, which is in drive connection with the transmission mechanism and which in the normal operation is electric-motor-driven in a first direction of rotation and has a profile, which co-operates with the locking device and which in the first direction of rotation allows rotation of the blocking disc independently of the locking device, wherein, in a second, opposite direction of rotation the profile of the blocking disc forms a stop surface able to be brought into contact with the locking device when the blocking disc adopts a rotational position in which the actuating rod is disposed in the unblocking position of the actuating rod, and wherein in the secondary alternate operation the stop surface is released by the locking device to allow the blocking disc to rotate in the second, opposite direction of rotation by the biasing force of said spring element, to enable the actuating rod to move into the blocking position.

2. An electric parking brake actuator according to claim 1, characterized in that the transmission mechanism comprises a planetary transmission which converts the drive input rotational speed of the planetary transmission generated by the electric motor into a lower drive output rotational speed of the planetary transmission.

3. An electric parking brake actuator according to claim 2, characterized in that the planetary transmission is of two-stage configuration with a first transmission stage and a second transmission stage.

4. An electric parking brake actuator, for actuation of a parking brake in a motor vehicle, comprising;
    a transmission mechanism which is accommodated in a housing and which is rotationally drivable by an electric motor and serves the purpose of conversion of a rotational movement into an axial movement of an actuating rod;
    said actuating rod is operatively connected with the transmission mechanism and carries an actuating element for the parking brake and which in normal operation is displaceable by way of the electric-motor-driven transmission mechanism from an unblocking position to a blocking position and conversely and is biased by a spring element in the direction of the blocking position;
    wherein a blocking mechanism is provided which serves the purpose of holding the actuating rod in the unblocking position of the actuating rod against the force of the spring element and for secondary alternate operation is selectably releasable by a locking device so that the actuating rod as a consequence of the force of the spring element moves into the blocking position without electric-motorized assistance, characterized in that the blocking mechanism comprises a blocking disc, which is in drive connection with the transmission mechanism and which in normal operation is electric-motor-driven in a first direction of rotation and has a profile, which co-operates with the locking device and which in the first direction of rotation allows rotation of the blocking disc independently of the locking device and in a second, opposite direction of rotation forms a stop surface able to be brought into contact with the locking device when the blocking disc adopts a rotational position in which the actuating rod is disposed in the unblocking position of the actuating rod, wherein in secondary alternate operation the stop surface is releasable by the locking device to allow the blocking disc to rotate in the second direction of rotation, to enable the actuating rod moving into the blocking position;

the transmission mechanism comprises a planetary transmission which converts the drive input rotational speed of the planetary transmission generated by the electric motor into a lower drive output rotational speed of the planetary transmission;

the planetary transmission is of two-stage configuration with a first transmission stage and a second transmission stage; and the blocking disc is arranged between the first transmission stage and the second transmission stage.

5. An electric parking brake actuator according to claim 4, characterized in that the planetary transmission comprises a ring gear integrally injection-molded with the housing from plastics material.

6. An electric parking brake actuator according to claim 5, characterized in that the planetary transmission has planetary wheels of plastics material, the wheels being provided with straight toothings.

7. An electric parking brake actuator according to claim 6, characterized in that the transmission mechanism comprises a crank arm to which the actuating rod is eccentrically coupled so as to convert the rotational movement into the axial movement.

8. An electric parking brake actuator according to claim 7, characterized in that a planetary carrier of the planetary transmission forms the crank arm.

9. An electric parking brake actuator according to claim 8, characterized in that the profile is formed at the outer circumference of the blocking disc and the stop surface of the profile has with respect to an axis of rotation of the blocking disc a radially inner edge and a radially outer edge, wherein the profile extends at least partly in the form of an Archimedean spiral between the radially inner edge and the radially outer edge as seen over the circumference of the blocking disc.

10. An electric parking brake actuator according to claim 9, characterized in that the stop surface of the profile extends at a slight inclination with respect to a radial plane extending through the axis of rotation of the blocking disc so that the radially inner edge of the stop surface lies in front of the radially outer edge of the stop surface as seen in the sense of the first direction of rotation of the blocking disc.

11. An electric parking brake actuator according to claim 10, characterized in that the locking device is a solenoid with an axially movable plunger, which is surrounded by a coil fixed relative to the housing and which has a contact end opposite the profile of the blocking disc and is biased in the direction of the profile by a biasing spring, wherein the contact end bears against the profile in a de-energized state of the coil so that the end is capable of coming into engagement with the stop surface of the profile and in an energized state of the coil is drawn away from the profile against the force of the biasing spring so as to release the stop surface of the profile.

12. An electric parking brake actuator according to claim 11, characterized in that the housing is provided integrally with a flange for securing to a transmission casing, the flange having a central opening through which the actuating rod, which carries the actuating element, and the spring element extend outwardly.

13. An electric parking brake actuator according to claim 12, characterized in that an electronic module comprising at least one electronic system required for activation of the electric motor and an interface module for electrical contact-making with the parking brake actuator is integrated in the housing, wherein the transmission mechanism in the housing is separated by an intermediate cover from the electronic module, which in turn is sealed off from the environment by means of an outer cover secured to the housing.

14. An electric parking brake actuator according to claim 13, characterized in that the intermediate cover also holds in the housing a bearing that mounts a part of the transmission mechanism to be rotatable relative to the housing.

15. An electric parking brake actuator according to claim 13, characterized in that a sensor arrangement for positional detection of the actuating rod is also integrated in the housing, the sensor arrangement comprising a sensor element, which is provided in the electronic module, and a signal element, which is connected with the actuating rod or the crank arm in the region of the eccentric coupling of the actuating rod to the crank arm and which is detectable by the sensor element through the intermediate cover so as to detect at least the unblocking position and the blocking position of the actuating rod.

16. An electric parking brake actuator according to claim 2, characterized in that the planetary transmission comprises a ring gear integrally injection-molded with the housing from plastics material.

17. An electric parking brake actuator according to claim 2, characterized in that the planetary transmission has planetary wheels of plastics material, the wheels being provided with straight toothings.

18. An electric parking brake actuator according to claim 1, characterized in that the transmission mechanism comprises a crank arm to which the actuating rod is eccentrically coupled so as to convert the rotational movement into the axial movement.

19. An electric parking brake actuator according to claim 18, characterized in that the transmission mechanism comprises a planetary transmission which converts the drive input rotational speed of the planetary transmission generated by the electric motor into a lower drive output rotational speed of the planetary transmission wherein a planetary carrier of the planetary transmission forms the crank arm.

20. An electric parking brake actuator according to claim 1, characterized in that the profile is formed at the outer circumference of the blocking disc and the stop surface of the profile has with respect to an axis of rotation of the blocking disc a radially inner edge and a radially outer edge, wherein the profile extends at least partly in the form of an Archimedean spiral between the radially inner edge and the radially outer edge as seen over the circumference of the blocking disc.

21. An electric parking brake actuator according to claim 20, characterized in that the stop surface of the profile extends at a slight inclination with respect to a radial plane extending through the axis of rotation of the blocking disc so that the radially inner edge of the stop surface lies in front of the radially outer edge of the stop surface as seen in the sense of the first direction of rotation of the blocking disc.

22. An electric parking brake actuator according to claim 1, characterized in that the locking device is a solenoid with an axially movable plunger, which is surrounded by a coil fixed relative to the housing and which has a contact end opposite the profile of the blocking disc and is biased in the direction of the profile by a biasing spring, wherein the contact end bears against the profile in a de-energized state of the coil so that the end is capable of coming into engagement with the stop surface of the profile and in an energized state of the coil is drawn away from the profile against the force of the biasing spring so as to release the stop surface of the profile.

23. An electric parking brake actuator according to claim 1, characterized in that the housing is provided integrally with a flange for securing to a transmission casing, the flange having a central opening through which the actuating rod, which carries the actuating element, and the spring element extend outwardly.

24. An electric parking brake actuator according to claim 1, characterized in that an electronic module comprising at least one electronic system required for activation of the electric motor and an interface module for electrical contact-making with the parking brake actuator is integrated in the housing, wherein the transmission mechanism in the housing is separated by an intermediate cover from the electronic module, which in turn is sealed off from the environment by means of an outer cover secured to the housing.

25. An electric parking brake actuator according to claim 24, characterized in that the intermediate cover also holds in the housing a bearing that mounts a part of the transmission mechanism to be rotatable relative to the housing.

26. An electric parking brake actuator, for actuation of a parking brake in a motor vehicle comprising;
  a transmission mechanism which is accommodated in a housing and which is rotationally drivable by an electric motor and serves the purpose of conversion of a rotational movement into an axial movement of an actuating rod;
  said actuating rod is operatively connected with the transmission mechanism and carries an actuating element for the parking brake and which in normal operation is displaceable by way of the electric-motor-driven transmission mechanism from an unblocking position to a blocking position and conversely and is biased by a spring element in the direction of the blocking position;
  wherein a blocking mechanism is provided which serves the purpose of holding the actuating rod in the unblocking position of the actuating rod against the force of the spring element and for secondary alternate operation is selectably releasable by a locking device so that the actuating rod as a consequence of the force of the spring element moves into the blocking position without electric-motorized assistance, characterized in that the blocking mechanism comprises a blocking disc, which is in drive connection with the transmission mechanism and which in normal operation is electric-motor-driven in a first direction of rotation and has a profile, which co-operates with the locking device and which in the first direction of rotation allows rotation of the blocking disc independently of the locking device and in a second, opposite direction of rotation forms a stop surface able to be brought into contact with the locking device when the blocking disc adopts a rotational position in which the actuating rod is disposed in the unblocking position of the actuating rod, wherein in secondary alternate operation the stop surface is releasable by the locking device to allow the blocking disc to rotate in the second direction of rotation, to enable the actuating rod moving into the blocking position;
  an electronic module comprising at least one electronic system required for activation of the electric motor and an interface module for electrical contact-making with the parking brake actuator is integrated in the housing, wherein the transmission mechanism in the housing is separated by an intermediate cover from the electronic module, which in turn is sealed off from the environment by means of an outer cover secured to the housing;
  the transmission mechanism comprises a crank arm to which the actuating rod is eccentrically coupled so as to convert the rotational movement into the axial movement, wherein a sensor arrangement for positional detection of the actuating rod is also integrated in the housing, the sensor arrangement comprising a sensor element, which is provided in the electronic module, and a signal element, which is connected with the actuating rod or the crank arm in the region of the eccentric coupling of the actuating rod to the crank arm and which is detectable by means of the sensor element through the intermediate cover so as to detect at least the unblocking position and the blocking position of the actuating rod.

* * * * *